United States Patent
Das et al.

(10) Patent No.: US 12,333,832 B2
(45) Date of Patent: *Jun. 17, 2025

(54) METHOD AND SYSTEM TO DETECT A TEXT FROM MULTIMEDIA CONTENT CAPTURED AT A SCENE

(71) Applicant: Tata Consultancy Services Limited, Mumbai (IN)

(72) Inventors: Apurba Das, Bangalore (IN); Pallavi Saha, Bangalore (IN); Jaimin Ashokbhai Bhoi, Bangalore (IN); Nikhil Shaw, Bangalore (IN); Govind Jee, Bangalore (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 196 days.

This patent is subject to a terminal disclaimer.

(21) Appl. No.: 18/117,041

(22) Filed: Mar. 3, 2023

(65) Prior Publication Data

US 2023/0290165 A1    Sep. 14, 2023

(30) Foreign Application Priority Data

Mar. 11, 2022    (IN) .............................. 202221013459

(51) Int. Cl.
*G06V 30/146* (2022.01)
*G06V 20/62* (2022.01)
(Continued)

(52) U.S. Cl.
CPC .......... *G06V 30/1463* (2022.01); *G06V 20/63* (2022.01); *G06V 30/133* (2022.01);
(Continued)

(58) Field of Classification Search
CPC .. G06V 30/1463; G06V 20/63; G06V 30/133; G06V 30/1444; G06V 30/191; G06V 30/147
See application file for complete search history.

(56) References Cited

U.S. PATENT DOCUMENTS 7,616,814 B2    11/2009    Wolf et al.
9,171,204 B2 *  10/2015    Acharya ............ G06V 30/1478
(Continued)

FOREIGN PATENT DOCUMENTS

CN            104871180 A       8/2015

*Primary Examiner* — Roberto Velez
*Assistant Examiner* — Daniella M. DiGuglielmo
(74) *Attorney, Agent, or Firm* — Finnegan, Henderson, Farabow, Garrett & Dunner, LLP (57) ABSTRACT

Detection of textual phrases in a non-horizontal orientation at a scene is a critical problem. This disclosure relates to a processor implemented method to detect a text from multimedia content captured at a scene. An input original image is processed by a trained model to obtain an individual character with a bounding box on the original image. The original image is positioned by a gradient to obtain a rotated image if a number of detected characters is not equal to a number of expected characters on the original image. At least one missing character bounding box on the original image and on the rotated image are estimated to construct a horizontal text image if the number of detected characters is not equal to the number of expected characters on the rotated image. At least one missing character in the estimated bounding box is detected by at least one text returned from an optical character reader.

18 Claims, 7 Drawing Sheets

(51) Int. Cl.
    *G06V 30/12*         (2022.01)
    *G06V 30/14*         (2022.01)
    *G06V 30/19*         (2022.01)

(52) U.S. Cl.
    CPC ........ *G06V 30/1444* (2022.01); *G06V 30/147* (2022.01); *G06V 30/191* (2022.01)

(56) References Cited

U.S. PATENT DOCUMENTS

| | | | |
|---|---|---|---|
| 10,146,994 B2 | 12/2018 | Jin et al. | |
| 2018/0150689 A1* | 5/2018 | Kimura | G06V 30/1906 |
| 2019/0272438 A1* | 9/2019 | Liu | G06N 3/045 |
| 2020/0089985 A1* | 3/2020 | Wang | G06V 30/1463 |
| 2021/0034856 A1* | 2/2021 | Torres | G06V 30/414 |

\* cited by examiner

METHOD AND SYSTEM TO DETECT A TEXT FROM MULTIMEDIA CONTENT CAPTURED AT A SCENE

PRIORITY CLAIM

This U.S. patent application claims priority under 35 U.S.C. § 119 to: India Application No. 202221013459, filed on Mar. 11, 2022. The entire contents of the aforementioned application are incorporated herein by reference.

TECHNICAL FIELD

This disclosure relates generally to image processing, and, more particularly, to a method and system to detect a text from a multimedia content captured at a scene.

BACKGROUND

Detection and recognition of a textual region in a scene is a critical problem especially when a textual phrase is written in different orientations i.e., non-horizontal/vertical orientation which is angular at 30-degree, 90-degree etc. Popular Optical Character Recognition (OCR) algorithms are usually designed for horizontal text and not for vertical text. Practically, a camera captures a scene with multiple targets in mind and sometimes very casually, which does not always ensure a frontal capture of a number of textual regions. This creates additional complexity for oriented texts by affine viewpoints. Existing text detection and recognition system do not work well for text in a vertical orientation. Traditional text recognition systems expect words in a horizontal alignment.

SUMMARY

Embodiments of the present disclosure present technological improvements as solutions to one or more of the above-mentioned technical problems recognized by the inventors in conventional systems. For example, in one embodiment, a processor implemented method of detecting a text from a multimedia content captured at a scene is provided. The processor implemented method includes at least one of: receiving, via one or more hardware processors, an original image captured from a scene as an input; processing, via the one or more hardware processors, the original image by a trained model to obtain one or more individual characters associated with one or more bounding boxes on the original image; determining, via the one or more hardware processors, whether a number of detected characters is equal to a number of expected characters (N) on the original image based on the one or more individual characters associated with the one or more bounding boxes on the original image, in response to determining that the number of detected characters is not equal to the number of expected characters (N) on the original image, performing the steps of: determining, via the one or more hardware processors, a gradient at which one or more texts are inclined by the one or more bounding boxes from the original image; positioning, via the one or more hardware processors, the original image by the gradient to obtain a rotated image; and processing, via the one or more hardware processors, the rotated image by the trained model to obtain one or more individual characters associated with one or more bounding boxes; determining, via the one or more hardware processors, whether the number of detected characters is equal to the number of expected characters (N) on the rotated image based on the one or more individual characters associated with the one or more bounding boxes on the rotated image, in response to determining that the number of detected characters is not equal to the number of expected characters (N) on the rotated image, performing the steps of: estimating, via the one or more hardware processors, one or more missing character bounding boxes on the original image, and one or more missing character bounding boxes on the rotated image; and constructing, via the one or more hardware processors, a horizontal text image; and detecting, via the one or more hardware processors, one or more missing characters in the one or more estimated bounding boxes based on one or more returned texts. The rotated image corresponds to one or more texts aligned in a vertical orientation.

In an embodiment, if the number of detected characters is equal to the number of expected characters (N) on the original image then the step of detection of the one or more missing characters of the one or more texts is terminated. In an embodiment, if the number of detected characters is equal to the number of expected characters (N) on the rotated image then the step of detection of the one or more missing characters of the one or more texts is terminated. In an embodiment, the missing character bounding boxes on the original image corresponds to: (i) a top missing detection, (ii) a middle missing detection, and (iii) a bottom missing detection. In an embodiment, the missing character bounding boxes on the rotated image corresponds to: (i) a top missing detection, (ii) a middle missing detection, and (iii) a bottom missing detection. In an embodiment, the horizontal text image is constructed when the one or more bounding boxes from the trained model on the original image and the estimated missing character bounding boxes on the original image are aligned in a horizontal orientation. In an embodiment, the horizontal text image is constructed when the one or more bounding boxes from the trained model on the rotated image and the estimated missing character bounding boxes on the rotated image are aligned in a horizontal orientation.

In another aspect, there is provided a system for detection of a text from a multimedia content captured at a scene. The system includes a memory storing instructions; one or more communication interfaces; and one or more hardware processors coupled to the memory via the one or more communication interfaces, wherein the one or more hardware processors are configured by the instructions to: receive, an original image captured from a scene as an input; process, the original image by a trained model to obtain one or more individual characters associated with one or more bounding boxes on the original image; determine, whether a number of detected characters is equal to a number of expected characters (N) on the original image based on the one or more individual characters associated with the one or more bounding boxes on the original image, in response to determining that the number of detected characters is not equal to the number of expected characters (N) on the original image, perform the steps of: determine, a gradient at which one or more texts are inclined by the one or more bounding boxes from the original image; position, the original image by the gradient to obtain a rotated image; and process, the rotated image by the trained model to obtain one or more individual characters associated with one or more bounding boxes one or more; determine, whether the number of detected characters is equal to the number of expected characters (N) on the rotated image based on the one or more individual characters associated with the one or more bounding boxes on the rotated image, in response to determining that the number of detected characters is not equal to the number of expected characters (N) on the rotated image, perform the steps of: estimate, one or more missing character bounding boxes on the original image, and one or more missing character bounding boxes on the rotated image; and construct, a horizontal text image and feed the horizontal text image to an optical character reader (OCR); and detect, one or more missing characters in the one or more estimated bounding boxes based on one or more texts returned from the optical character reader (OCR). The rotated image corresponds to one or more texts aligned in a vertical orientation.

In an embodiment, if the number of detected characters is equal to the number of expected characters (N) on the original image then the step of detection of the one or more missing characters of the one or more texts is terminated. In an embodiment, if the number of detected characters is equal to the number of expected characters (N) on the rotated image then the step of detection of the one or more missing characters of the one or more texts is terminated. In an embodiment, the missing character bounding boxes on the original image corresponds to: (i) a top missing detection, (ii) a middle missing detection, and (iii) a bottom missing detection. In an embodiment, the missing character bounding boxes on the rotated image corresponds to: (i) a top missing detection, (ii) a middle missing detection, and (iii) a bottom missing detection. In an embodiment, the horizontal text image is constructed when the one or more bounding boxes from the trained model on the original image and the estimated missing character bounding boxes on the original image are aligned in a horizontal orientation. In an embodiment, the horizontal text image is constructed when the one or more bounding boxes from the trained model on the rotated image and the estimated missing character bounding boxes on the rotated image are aligned in a horizontal orientation.

In yet another aspect, there are provided one or more non-transitory machine readable information storage mediums comprising one or more instructions which when executed by one or more hardware processors causes at least one of: receiving, an original image captured from a scene as an input; processing, the original image by a trained model to obtain one or more individual characters associated with one or more bounding boxes on the original image; determining, whether a number of detected characters is equal to a number of expected characters (N) on the original image based on the one or more individual characters associated with the one or more bounding boxes on the original image, in response to determining that the number of detected characters is not equal to the number of expected characters (N) on the original image, performing the steps of: determining, a gradient at which one or more texts are inclined by the one or more bounding boxes from the original image; positioning, the original image by the gradient to obtain a rotated image; and processing, the rotated image by the trained model to obtain one or more individual characters associated with one or more bounding boxes; determining, whether the number of detected characters is equal to the number of expected characters (N) on the rotated image based on the one or more individual characters associated with the one or more bounding boxes on the rotated image, in response to determining that the number of detected characters is not equal to the number of expected characters (N) on the rotated image, performing the steps of: estimating, one or more missing character bounding boxes on the original image, and one or more missing character bounding boxes on the rotated image; and constructing, a horizontal text image; and detecting, one or more missing characters in the one or more estimated bounding boxes based on one or more returned texts. The rotated image corresponds to one or more texts aligned in a vertical orientation.

In an embodiment, if the number of detected characters is equal to the number of expected characters (N) on the original image then the step of detection of the one or more missing characters of the one or more texts is terminated. In an embodiment, if the number of detected characters is equal to the number of expected characters (N) on the rotated image then the step of detection of the one or more missing characters of the one or more texts is terminated. In an embodiment, the missing character bounding boxes on the original image corresponds to: (i) a top missing detection, (ii) a middle missing detection, and (iii) a bottom missing detection. In an embodiment, the missing character bounding boxes on the rotated image corresponds to: (i) a top missing detection, (ii) a middle missing detection, and (iii) a bottom missing detection. In an embodiment, the horizontal text image is constructed when the one or more bounding boxes from the trained model on the original image and the estimated missing character bounding boxes on the original image are aligned in a horizontal orientation. In an embodiment, the horizontal text image is constructed when the one or more bounding boxes from the trained model on the rotated image and the estimated missing character bounding boxes on the rotated image are aligned in a horizontal orientation.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

There is a need to detect and recognize a textual region in different orientations (i.e., a slant orientation or a vertical orientation) in a scene. Embodiments of the present disclosure provide a method and system to detect a text from multimedia content captured at a scene. The text can be an alpha-numeric character and may be at least one of: (a) partial, or (b) missing, or (c) broken, or oriented at a specific angle. The embodiment of the present disclosure also determines orientation, and affine mapping without any knowledge on camera properties. Based on the determined orientation, missing characters in a region are interpolated with a non-linear scaling. Finally, the text is recognized by horizontal warping and correction is performed based on a dictionary and semantics.

Referring now to the drawings, and more particularly to FIGS. 1 through 48, where similar reference characters denote corresponding features consistently throughout the figures, there are shown preferred embodiments and these embodiments are described in the context of the following exemplary system and/or method.

Figure 1:
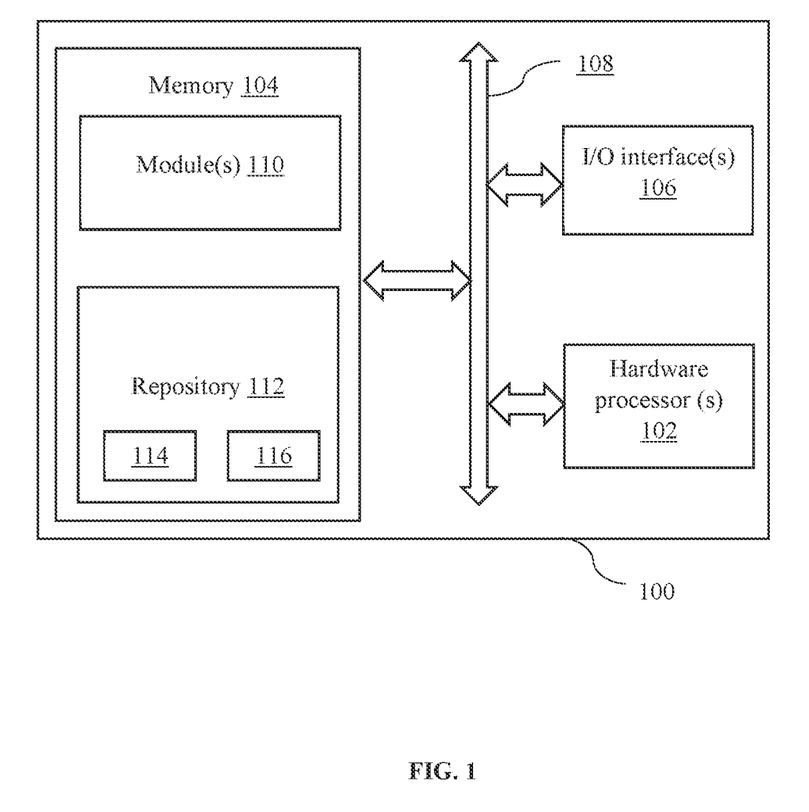
FIG. 1 illustrates a system for detection of a text from a multimedia content captured at a scene, according to an embodiment of the present disclosure.

FIG. 1 illustrates a system 100 for detection of the text from the multimedia content captured at the scene, according to an embodiment of the present disclosure. In an embodiment, the system 100 includes one or more processor(s) 102, communication interface device(s) or input/output (I/O) interface(s) 106, and one or more data storage devices or memory 104 operatively coupled to the one or more processors 102. The memory 104 includes a database. The one or more processor(s) processor 102, the memory 104, and the I/O interface(s) 106 may be coupled by a system bus such as a system bus 108 or a similar mechanism. The system 100 is further connected via the I/O interface(s) 106. The one or more processor(s) 102 that are hardware processors can be implemented as one or more microprocessors, microcomputers, microcontrollers, digital signal processors, central processing units, state machines, logic circuitries, and/or any devices that manipulate signals based on operational instructions. Among other capabilities, the one or more processor(s) 102 is configured to fetch and execute computer-readable instructions stored in the memory 104. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like. The I/O interface device(s) 106 may include a variety of software and hardware interfaces, for example, interfaces for peripheral device(s), such as a keyboard, a mouse, an external memory, a camera device, and a printer. Further, the I/O interface device(s) 106 may enable the system 100 to communicate with other devices, such as web servers and external databases. The I/O interface device(s) 106 can facilitate multiple communications within a wide variety of networks and protocol types, including wired networks, for example, local area network (LAN), cable, etc., and wireless networks, such as Wireless LAN (WLAN), cellular, or satellite. In an embodiment, the I/O interface device(s) 106 can include one or more ports for connecting number of devices to one another or to another server.

The memory 104 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes. In an embodiment, the memory 104 includes a plurality of modules 110 and a repository 112 for storing data processed, received, and generated by the plurality of modules 110. The plurality of modules 110 may include routines, programs, objects, components, data structures, and so on, which perform particular tasks or implement particular abstract data types.

Further, a database in the repository 112 stores information pertaining to inputs fed to the system 100 and/or outputs generated by the system (e.g., data/output generated at each stage of the data processing) 100, specific to the methodology described herein. More specifically, the database stores information being processed at each step of the proposed methodology.

Additionally, the plurality of modules 110 may include programs or coded instructions that supplement applications and functions of the system 100. The repository 112, amongst other things, includes a system database 114 and other data 116. The other data 116 may include data generated as a result of the execution of one or more modules in the plurality of modules 110. Further, the database stores information pertaining to inputs fed to the system 100 and/or outputs generated by the system (e.g., at each stage), specific to the methodology described herein. Herein, the memory 104 and the computer program code configured to, with the hardware processor for example the processor 102, causes the system 100 to perform various functions described herein under.

Figure 2:
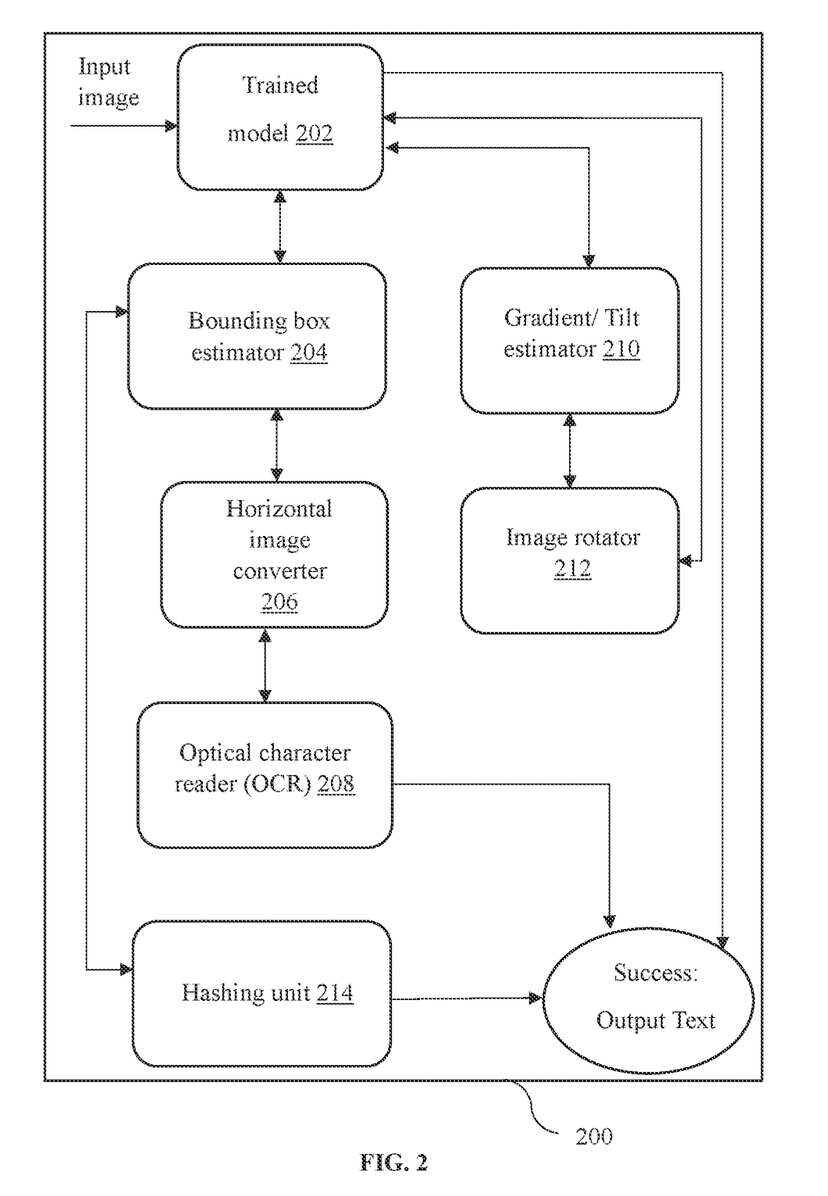
FIG. 2 illustrates an exemplary functional block diagram of the system of FIG. 1, according to some embodiments of the present disclosure.

FIG. 2 illustrates an exemplary functional block diagram of the system 100 of FIG.1, according to some embodiments of the present disclosure. The system 200 may be an example of the system 100 (FIG. 1). In an example embodiment, the system 200 may be embodied in, or is in direct communication with the system, for example the system 100 (FIG. 1). The system 100 is configured to detect a text from the multimedia content captured at the scene. In specific, the system 100 is configured to detect one or more alpha-numeric characters from the multimedia content captured at the scene. The one or more alpha-numeric characters captured at the scene can be (a) partial alpha-numeric character, (b) missing alpha-numeric character, (c) broken alpha-numeric character, (d) positioned alpha-numeric character at a particular angle. In an embodiment, the one or more alpha-numeric characters are alternatively referred to as one or more characters respectively. The system 200 includes a trained model 202, a bounding box estimator 204, a horizontal image converter 206, an optical character reader (OCR) 208, a gradient/tilt estimator 210, an image rotator 212, and a hashing unit 214. The multimedia content captured from the scene is received as an input at a trained model 202. The multimedia content corresponds to but not limited to an image, a video stream. For example, the multimedia content captured from the scene corresponds to: (a) capturing from a vehicle with a number plate, (b) capturing from a container at a docking station, and (c) capturing from a library. The scene corresponds to but is not limited to an indoor, an outdoor environment. The orientation corresponds to but is not limited to a horizontal orientation, a vertical orientation, or a curved orientation.

In an embodiment, the trained model 202 may be obtained by training a deep convolutional network for one or more characters (e.g., an alpha numeric character) with an output of one or more numeric characters (e.g., position of the alphanumeric). The bounding box estimator 204 is configured to obtain one or more individual characters associated with one or more bounding boxes on an original image by the trained model 202. A check operation is performed to determine whether a number of detected characters is equal to a number of expected characters (N) on the original image based on the one or more individual characters associated with one or more bounding boxes on the original image. The step performed to detect the one or more missing characters of the one or more texts is terminated if the number of detected characters is equal to the number of expected characters (N) on the original image. Alternatively, if the number of detected characters is not equal to the number of expected characters (N) on the original image then the gradient/tilt estimator 210 is configured to determine a gradient at which corresponding text is inclined based on the one or more bounding boxes from the original image.

The image rotator 212 is configured to position the original image at a particular orientation by the gradient to obtain a rotated image. The rotated image corresponds to one or more texts aligned in a vertical orientation. In an embodiment, an angle of rotation for the original image is decided based on considering a midpoint of a first detected bounding box (P1) of the character and drawing a line from that point to a last midpoint of a detected bounding box (P2). The bounding box estimator 204 is configured to process the rotated image by the trained model 202 to obtain one or more individual characters associated with one or more bounding boxes on a rotated image. In an embodiment, a model inference provides one or more detected characters in the image and corresponding one or more bounding boxes. In an embodiment, the one or more bounding boxes correspond to a list of points which describes where the alphabet is in the input image. A check operation is performed to determine whether the number of detected characters is equal to the number of expected characters (N) on the rotated image based on the one or more individual characters associated with one or more bounding boxes on the rotated image. The step performed to detect the one or more missing characters of the one or more texts is terminated if the number of detected characters is equal to the number of expected characters (N) on the rotated image.

Alternatively, if the number of detected characters is not equal to the number of expected characters (N) on the rotated image then one or more missing character bounding boxes on the original image, and (ii) one or more missing character bounding boxes on the rotated image are estimated. In an embodiment, the missing character bounding boxes on the original image corresponds to (i) the top missing detection, (ii) the middle missing detection, and (iii) the bottom missing detection. In another embodiment, the missing character bounding boxes on the rotated image corresponds to (i) the top missing detection, (ii) the middle missing detection, and (iii) the bottom missing detection.

Figure 3A:
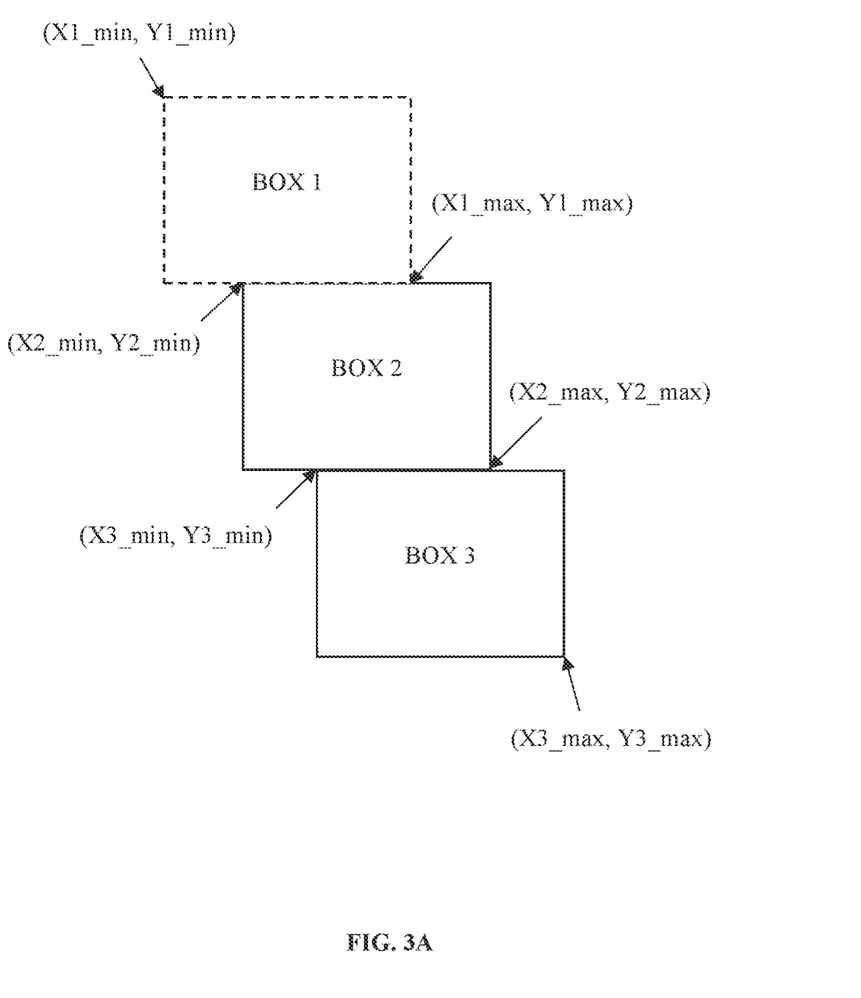
FIG. 3A-3C are block diagrams that illustrate a top missing detection, a middle missing detection, and a bottom missing detection respectively, according to an embodiment of the present disclosure.
Figure 3B:
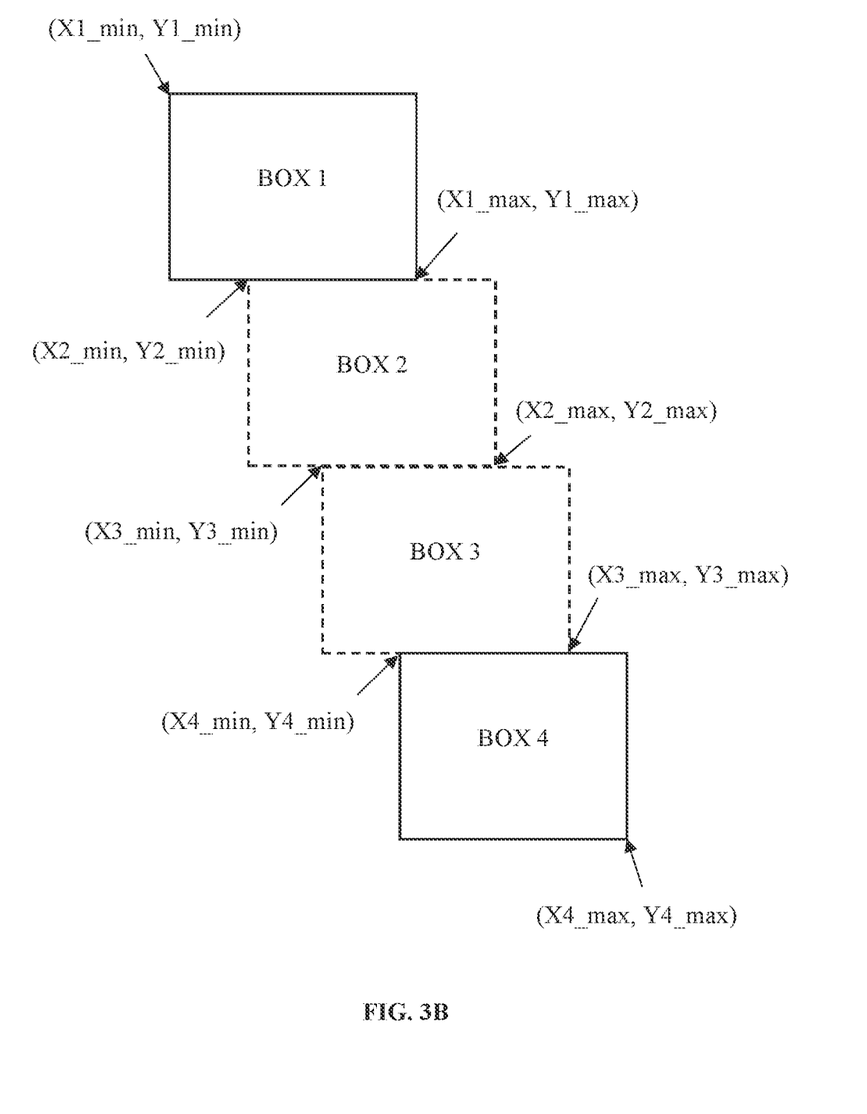
Figure 3C:
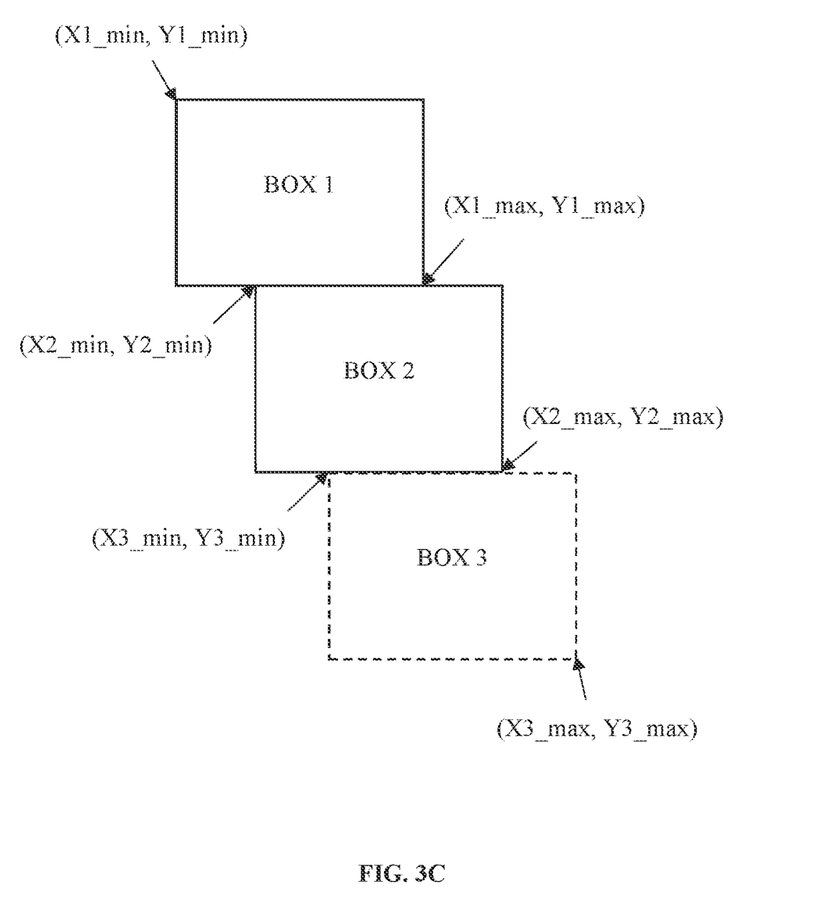

With reference to FIG. 3A-3C are block diagrams that illustrate the top missing detection, the middle missing detection, and the bottom missing detection respectively, according to an embodiment of the present disclosure. In an exemplary embodiment, the top missing detections are given as below:

Considering detections for Box 2 and Box 3 is available, then detection for Box 1 is estimated as:

$Box3\_height = Y3\_max - Y3\_min$ $Box2\_height = Y3\_max - Y3\_min$

Estimate X translation $dx\_min = X3\_min - X2\_min$ $dx\_max = X3\_max - X2\_max$

Estimate difference in height $Y\_change = Box3\_height - Box2\_height$ $Box1\_height = Box2\_height - Y\_change$

Draw the bounding box $X1\_min = X2\_min - dx\_min$ $Y1\_min = Y2\_min - Box1\_height$ $X1\_max = X2\_max - dx\_max$ $Y1\_max = Y2\_max$ In an embodiment, the middle missing detections are given as below:

Considering, detections for Box 1 and Box 4 (comprising corner points (X4_min, Y4_min) and (X4_max, Y4_max)) are available, then detections for Box 2 and Box 3 are estimated.

$Height1 = X1\_max - X1\_min$ $Height4 = X4\_max - X4\_min$ $Height\_avg = (Height1 + Height2)/2$ $Y\_diff = Y4\_min - Y1\_max$ while ($Y\_diff > (0.7 * Height\_avg)$):
Estimate number of characters in between the two boxes $gaps = Y\_diff / Height\_avg$

Find average translation of BB in x and y direction $dx\_min = X4\_min - X1\_min$ $dx\_max = X4\_max - X1\_max$ $dx\_min /= (gaps + 1)$ $dx\_max /= (gaps + 1)$

Estimate the bounding boxes $X2\_min = X1\_min + dx\_min$ $Y2\_min = Y1\_max$ $X2\_max = X1\_max + dx\_max$ $Y2\_max = Y1\_max + Height\_avg$

Update for next iteration $gaps\ -= 1$

Replace X1 with X2 in loop body to get X3.

In an embodiment, the bottom missing detections are given as below:

Consider detections for Box 1 and Box 2 are available, then detection for Box 3 is estimated, $Box1\_height = Y1\_max - Y1\_min$ $Box2\_height = Y3\_max - Y3\_min$

Estimate X translation $dx\_min = X2\_min - X1\_min$ $dx\_max = X2\_max - X1\_max$

Estimate difference in height $Y\_change = Box2\_height - Box1\_height$ $Box3\_height = Box2\_height + Y\_change$ draw the bounding box $X3\_min = X2\_min + dx\_min$ $Y3\_min = Y2\_max$ $X1\_max = X2\_max + dx\_max$ $Y1\_max = Y2\_max + Box3\_height$ The horizontal image converter 206 is configured to construct a horizontal text image. The horizontal text image is constructed when the one or more bounding boxes from the trained model 202 on the original image and the estimated missing character bounding boxes on the original image are aligned in a horizontal orientation. Similarly, the horizontal text image is constructed when the one or more bounding boxes from the trained model 202 on the rotated image and the estimated missing character bounding boxes on the rotated image are aligned in a horizontal orientation. The horizontal text image is fed to the optical character reader (OCR) 208. The one or more missing characters in the one or more estimated missing character bounding boxes are detected based on one or more text returned from the optical character reader (OCR) 208.

In an embodiment, the hashing unit 214 is configured to determine the one or more missing characters inside the one or more estimated bounding boxes in the original image and in the rotated image. For example, one reference image containing a character (image1), and one input image containing a character (image2) are considered. An average hash (A_hash) and a perceptual hash (P_hash) values of the two images are calculated.

If $(A\_hash\ of\ image1 - A\_hash\ of\ image2) + (P\_hash\ of\ image1 - P\_hash\ of\ image2) < threshold$ (a) then the two images are of same character
(b) else the two images do not have same character.

Figure 4A:
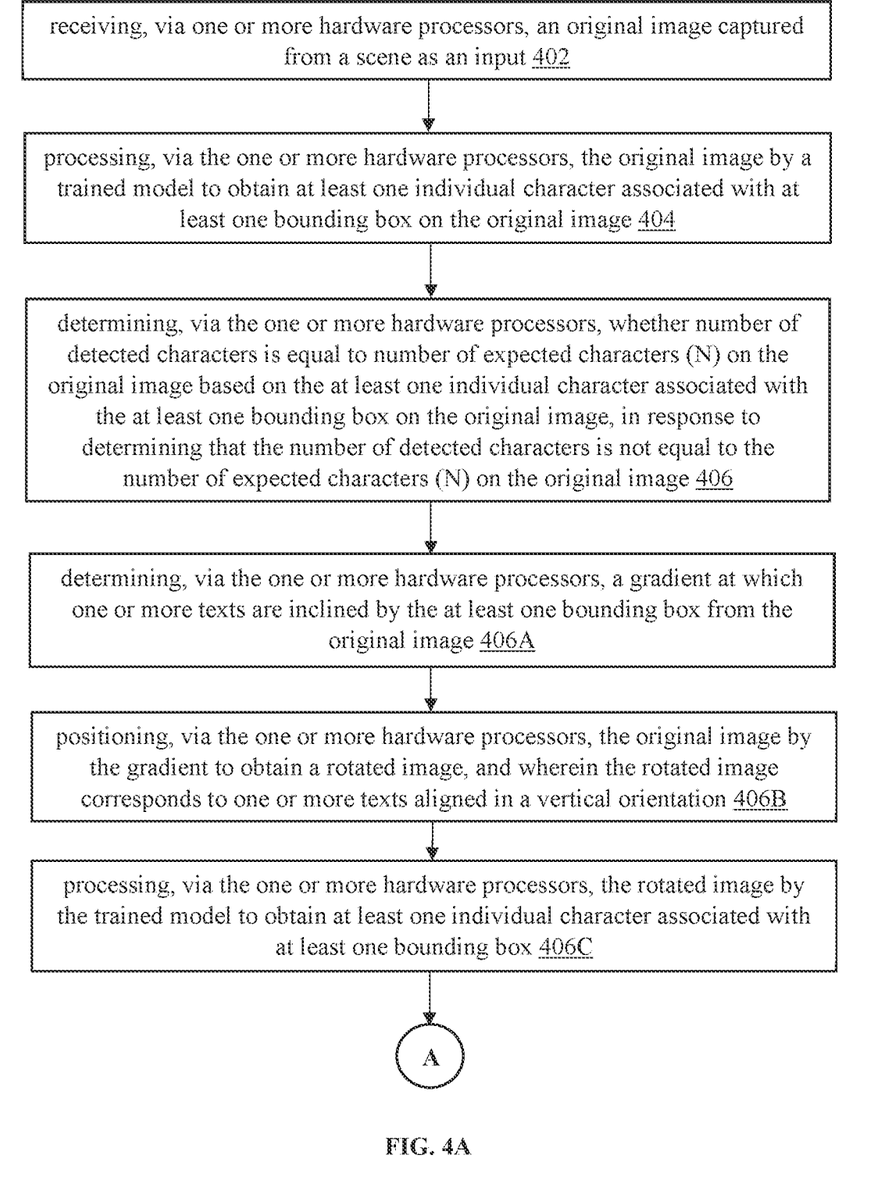
FIG. 4A-FIG. 4B are exemplary flow diagrams illustrating a method of detecting the text from the multimedia content captured at the scene, according to an embodiment of the present disclosure.
Figure 4B:
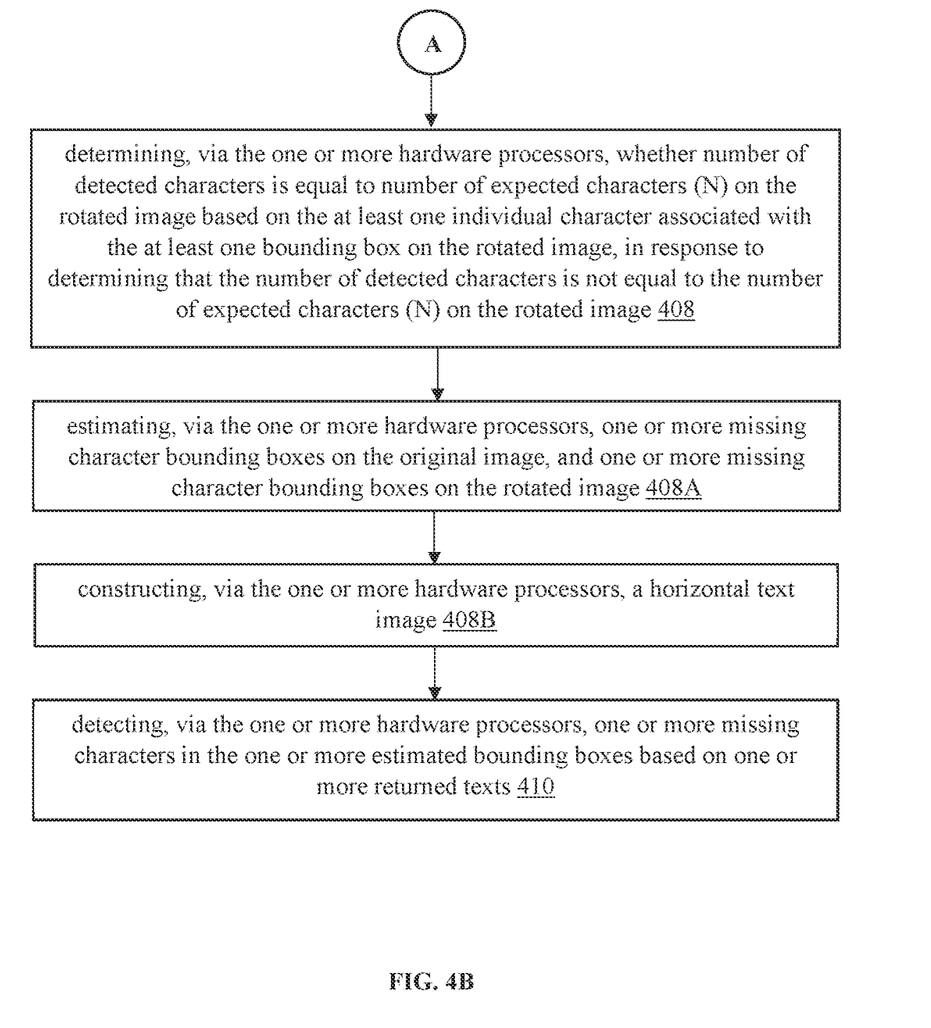

FIG. 4A-FIG. 4B are exemplary flow diagrams illustrating a method 400 of detecting the text from the multimedia content captured at the scene, according to an embodiment of the present disclosure. In an embodiment, the system 100 comprises one or more data storage devices or the memory 104 operatively coupled to the one or more hardware processors 102 and is configured to store instructions for execution of steps of the method 400 by the one or more hardware processors 102. The flow diagram depicted is better understood by way of following explanation/description. The steps of the method of the present disclosure will now be explained with reference to the components of the system as depicted in FIGS. 1 and 2.

At step 402, the original image captured from the scene is received as the input. At step 404, the original image is processed by the trained model 202 to obtain the one or more individual characters associated with the one or more bounding boxes on the original image. At step 406, whether the number of detected characters is equal to the number of expected characters (N) on the original image is determined based on the one or more individual characters associated with the one or more bounding boxes on the original image. In an embodiment, if the number of detected characters is equal to the number of expected characters (N) on the original image then the step of detection of the one or more missing characters of the one or more texts is terminated. Alternatively, if the number of detected characters is not equal to the number of expected characters (N) on the original image then at step 406A, the gradient at which the one or more texts are inclined is determined by the one or more bounding boxes from the original image. At step 406B, the original image is positioned by the gradient to obtain the rotated image. The rotated image corresponds to the one or more texts aligned in the vertical orientation. At step 406C, the rotated image is processed by the trained model 202 to obtain the one or more individual characters associated with the one or more bounding box.

At step 408, whether the number of detected characters is equal to the number of expected characters (N) on the rotated image is determined based on the one or more individual characters associated with the one or more bounding boxes on the rotated image. In another embodiment, if the number of detected characters is equal to the number of expected characters (N) on the rotated image then the step of detection of the one or more missing characters of the one or more texts is terminated. Alternatively, if the number of detected characters is not equal to the number of expected characters (N) on the rotated image then at step 408A, the one or more missing character bounding boxes on the original image, and the one or more missing character bounding boxes on the rotated image is estimated. In an embodiment, the missing character bounding boxes on the original image corresponds to: (i) the top missing detection, (ii) the middle missing detection, and (iii) the bottom missing detection. In another embodiment, the missing character bounding boxes on the rotated image corresponds to: (i) the top missing detection, (ii) the middle missing detection, and (iii) the bottom missing detection. At step 408B, the horizontal text image is constructed and fed to the optical character reader (OCR) 208. In an embodiment, the horizontal text image is constructed when the one or more bounding boxes from the trained model 202 on the original image and the estimated missing character bounding boxes on the original image are aligned in the horizontal orientation. In an embodiment, the horizontal text image is constructed when the one or more bounding boxes from the trained model 202 on the rotated image and the estimated missing character bounding boxes on the rotated image are aligned in the horizontal orientation. At step 410, the one or more missing characters in the one or more estimated bounding boxes is detected based on the one or more texts returned from the optical character reader (OCR) 208.

The embodiment of the present disclosure herein addresses unresolved problems of detection of the text in the scene, especially when the text is written in a slant or a vertical orientation. The embodiment addresses the missing detection through dynamic threshold adaptation and confidence tuning. The embodiment of present disclosure herein provides the system and method to detect the text aligned or inclined at any angle at the scene e.g., a vertical text, a horizontal text, a curved text at the scene. The embodiment of present disclosure herein works on an image and video data. The system detects any undetected corrupted/low confidence text regions in non-uniformly aligned fashion. Based on an aspect ratio and an alignment of detected text regions, interpolates position of missed detection. The system provides an ability to stack one or more detected alphabets in a horizontal position to be consumed by any OCR engine but is not limited to e.g., an azure OCR engine, a cloud vision OCR engine.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:
   receiving, via one or more hardware processors, an original image captured from a scene as an input;
   processing, via the one or more hardware processors, the original image by a trained model to obtain at least one individual character associated with at least one bounding box on the original image;
   determining, via the one or more hardware processors, whether a number of detected characters is equal to a number of expected characters (N) on the original image based on the at least one individual character associated with the at least one bounding box on the original image, wherein performing, in response to determining that the number of detected characters is not equal to the number of expected characters (N) on the original image, the steps of:
      determining, via the one or more hardware processors, a gradient at which one or more texts are inclined by the at least one bounding box from the original image;
      positioning, via the one or more hardware processors, the original image by the gradient to obtain a rotated image, and wherein the rotated image corresponds to the one or more texts aligned in a vertical orientation; and
      processing, via the one or more hardware processors, the rotated image by the trained model to obtain at least one individual character associated with at least one bounding box on the rotated image;
   determining, via the one or more hardware processors, whether a number of detected characters is equal to a number of expected characters (N) on the rotated image based on the at least one individual character associated with the at least one bounding box on the rotated image, wherein performing, in response to determining that the number of detected characters is not equal to the number of expected characters (N) on the rotated image, the steps of:
      estimating, via the one or more hardware processors, one or more missing character bounding boxes on the original image, and one or more missing character bounding boxes on the rotated image; and
      constructing, via the one or more hardware processors, a horizontal text image; and
   detecting, via the one or more hardware processors, one or more missing characters in the one or more estimated missing character bounding boxes based on one or more returned texts.

2. The processor implemented method of claim 1, wherein the step of detecting the one or more missing characters is terminated when the number of detected characters is equal to the number of expected characters (N) on the original image.

3. The processor implemented method of claim 1, wherein the step of detecting the one or more missing characters is terminated when the number of detected characters is equal to the number of expected characters (N) on the rotated image.

4. The processor implemented method of claim 1, wherein the missing character bounding boxes on the original image corresponds to: (i) a top missing detection, (ii) a middle missing detection, and (iii) a bottom missing detection, and wherein the missing character bounding boxes on the rotated image corresponds to: (i) a top missing detection, (ii) a middle missing detection, and (iii) a bottom missing detection.

5. The processor implemented method of claim 1, wherein the horizontal text image is constructed when the at least one bounding box from the trained model on the original image and the estimated missing character bounding boxes on the original image are aligned in a horizontal orientation.

6. The processor implemented method of claim 1, wherein the horizontal text image is constructed when the at least one bounding box from the trained model on the rotated image and the estimated missing character bounding boxes on the rotated image are aligned in a horizontal orientation.

7. A system, comprising:
a memory storing instructions;
one or more communication interfaces; and
one or more hardware processors coupled to the memory via the one or more communication interfaces,
wherein the one or more hardware processors are configured by the instructions to:
receive, an original image captured from a scene as an input;
process, the original image by a trained model to obtain at least one individual character associated with at least one bounding box on the original image;
determine, whether a number of detected characters is equal to a number of expected characters (N) on the original image based on the at least one individual character associated with the at least one bounding box on the original image, wherein perform, in response to determine that the number of detected characters is not equal to the number of expected characters (N) on the original image, the steps of:
determine, a gradient at which one or more texts are inclined by the at least one bounding box from the original image;
position, the original image by the gradient to obtain a rotated image, and wherein the rotated image corresponds to the one or more texts aligned in a vertical orientation; and
process, the rotated image by the trained model to obtain at least one individual character associated with at least one bounding box on the rotated image;
determine, whether a number of detected characters is equal to a number of expected characters (N) on the rotated image based on the at least one individual character associated with the at least one bounding box on the rotated image, wherein perform, in response to determining that the number of detected characters is not equal to the number of expected characters (N) on the rotated image, the steps of:
estimate, one or more missing character bounding boxes on the original image, and one or more missing character bounding boxes on the rotated image; and
construct, a horizontal text image and feed the horizontal image to an optical character reader (OCR); and
detect, one or more missing characters in the one or more estimated missing character bounding boxes based on one or more texts returned from the optical character reader (OCR).

8. The system of claim 7, wherein the one or more hardware processors are further configured by the instructions to: terminate, the step of detection of the one or more missing characters when the number of detected characters is equal to the number of expected characters (N) on the original image.

9. The system of claim 7, wherein the one or more hardware processors are further configured by the instructions to: terminate, the step of detection of the one or more missing characters when the number of detected characters is equal to the number of expected characters (N) on the rotated image.

10. The system of claim 7, wherein the missing character bounding boxes on the original image corresponds to: (i) a top missing detection, (ii) a middle missing detection, and (iii) a bottom missing detection, and wherein the missing character bounding boxes on the rotated image corresponds to: (i) a top missing detection, (ii) a middle missing detection, and (iii) a bottom missing detection.

11. The system of claim 7, wherein the horizontal text image is constructed when the at least one bounding box from the trained model on the original image and the estimated missing character bounding boxes on the original image are aligned in a horizontal orientation.

12. The system of claim 7, wherein the horizontal text image is constructed when the at least one bounding box from the trained model on the rotated image and the estimated missing character bounding boxes on the rotated image are aligned in a horizontal orientation.

13. One or more non-transitory machine-readable information storage mediums comprising one or more instructions which when executed by one or more hardware processors cause:
receiving, an original image captured from a scene as an input;
processing, the original image by a trained model to obtain at least one individual character associated with at least one bounding box on the original image;
determining, whether a number of detected characters is equal to a number of expected characters (N) on the original image based on the at least one individual character associated with the at least one bounding box on the original image, wherein performing, in response to determining that the number of detected characters is not equal to the number of expected characters (N) on the original image, the steps of:
determining, a gradient at which one or more texts are inclined by the at least one bounding box from the original image;
positioning, the original image by the gradient to obtain a rotated image, and wherein the rotated image corresponds to the one or more texts aligned in a vertical orientation; and
processing, the rotated image by the trained model to obtain at least one individual character associated with at least one bounding box on the rotated image;
determining, whether a number of detected characters is equal to a number of expected characters (N) on the rotated image based on the at least one individual character associated with the at least one bounding box on the rotated image, wherein performing, in response to determining that the number of detected characters is not equal to the number of expected characters (N) on the rotated image, the steps of:

estimating, one or more missing character bounding boxes on the original image, and one or more missing character bounding boxes on the rotated image; and constructing, a horizontal text image; and detecting, one or more missing characters in the one or more estimated missing character bounding boxes based on one or more returned texts.

14. The one or more non-transitory machine-readable information storage mediums of claim 13, wherein the step of detecting the one or more missing characters is terminated when the number of detected characters is equal to the number of expected characters (N) on the original image.

15. The one or more non-transitory machine-readable information storage mediums of claim 13, wherein the step of detecting the one or more missing characters is terminated when the number of detected characters is equal to the number of expected characters (N) on the rotated image.

16. The one or more non-transitory machine-readable information storage mediums of claim 13, wherein the missing character bounding boxes on the original image corresponds to: (i) a top missing detection, (ii) a middle missing detection, and (iii) a bottom missing detection, and wherein the missing character bounding boxes on the rotated image corresponds to: (i) a top missing detection, (ii) a middle missing detection, and (iii) a bottom missing detection.

17. The one or more non-transitory machine-readable information storage mediums of claim 13, wherein the horizontal text image is constructed when the at least one bounding box from the trained model on the original image and the estimated missing character bounding boxes on the original image are aligned in a horizontal orientation.

18. The one or more non-transitory machine-readable information storage mediums of claim 13, wherein the horizontal text image is constructed when the at least one bounding box from the trained model on the rotated image and the estimated missing character bounding boxes on the rotated image are aligned in a horizontal orientation.

* * * * *